United States Patent

Takanashi et al.

[11] Patent Number: 5,299,153
[45] Date of Patent: Mar. 29, 1994

[54] SYSTEM AND MEDIUM FOR RECORDING/REPRODUCING CHARGE LATENT IMAGE

[75] Inventors: Itsuo Takanashi, Kamakura; Shintaro Nakagaki, Fujisawa; Hirohiko Shinonaga; Tsutou Asakura, both of Yokohama; Masato Furuya, Yokosuka; Hiromichi Tai, Yokosuka; Tetsuji Suzuki, Yokosuka, all of Japan

[73] Assignee: Victor Company Of Japan, Ltd., Yokohama, Japan

[21] Appl. No.: 826,665

[22] Filed: Jan. 29, 1992

Related U.S. Application Data

[62] Division of Ser. No. 430,983, Nov. 3, 1989, abandoned.

[30] Foreign Application Priority Data

Nov. 3, 1988 [JP] Japan .................. 63-278228
Mar. 23, 1989 [JP] Japan .................. 1-71172
Mar. 24, 1989 [JP] Japan .................. 1-72631

[51] Int. Cl.⁵ .............. G11C 13/04; H04N 5/335; H04N 3/14
[52] U.S. Cl. .................. 365/112; 365/106; 348/207; 348/294
[58] Field of Search .......... 365/106, 110, 112; 346/155, 160; 358/209, 213.11, 213.13, 217, 233, 236, 241

[56] References Cited

U.S. PATENT DOCUMENTS

| | | | |
|---|---|---|---|
| 3,932,025 | 1/1976 | Lakatos | 365/112 |
| 4,831,452 | 5/1989 | Takanashi et al. | 358/209 |
| 4,920,417 | 4/1990 | Takanashi et al. | 358/209 |
| 4,933,926 | 6/1990 | Tabei et al. | 365/112 |
| 4,959,722 | 9/1990 | Takanashi et al. | 358/211 |

FOREIGN PATENT DOCUMENTS

| | | | |
|---|---|---|---|
| 0273773 | 7/1988 | European Pat. Off. | 365/112 |
| 0327236 | 8/1989 | European Pat. Off. | 365/112 |
| 0398162 | 12/1989 | European Pat. Off. | 365/112 |
| 2-111173 | 4/1990 | Japan . | |

*Primary Examiner*—Glenn Gossage
*Attorney, Agent, or Firm*—Jacobson, Price, Holman & Stern

[57] ABSTRACT

A system for recording and reproducing a charge latent image in a recording medium has a transparent electrode (3), a photoconductive layer (4) on the electrode (3), a dielectric layer (8), a photoconductor layer (4) and a charge transfer suppressive layer (16). The system also includes a biasing element including a pair of electrodes (3, 19), a power source (10) for applying an electric field between the pair of electrodes, and an optical system (1) for directing an electro-magnetic radiation beam from an object (0) thereby forming an image thereof in the photoconductive layer (4). The reproducing system has a generating element (45, 48) for projecting the radiation beam toward the recording medium (41a, 41b), an element (20) for modulating the radiation beam, a first conversion element (55, 56) for converting the electromagnetic radiation beam directed out of the path, an element (49a, 49b) for projecting the intensity modulated beam to an object, a second conversion element (57, 58) for converting the intensity modulated beam into an electrical signal, and an element (54) for directing the intensity modulated beam to the projecting element and the second conversion element.

4 Claims, 11 Drawing Sheets

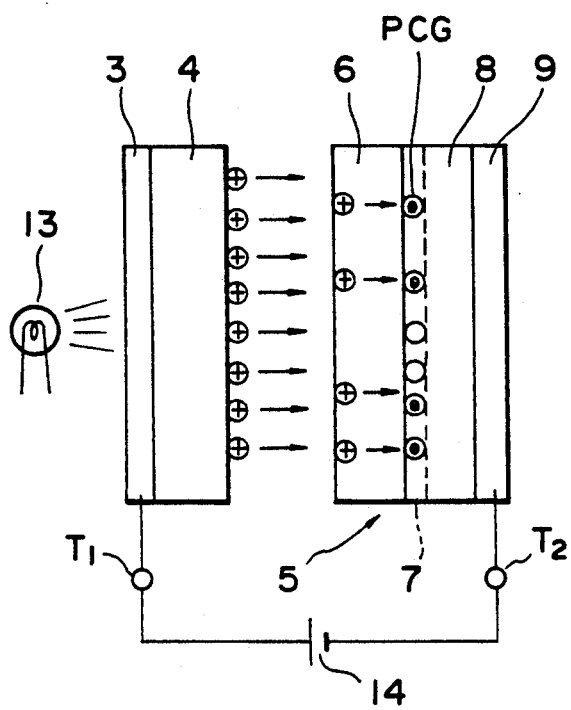
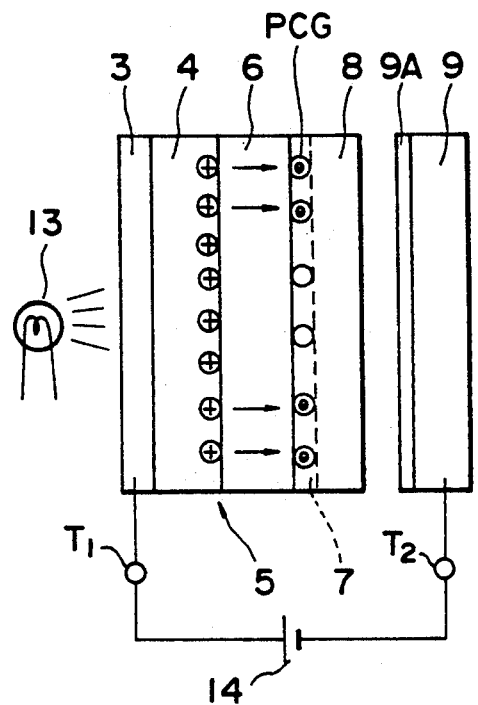
FIG. 6  FIG. 7
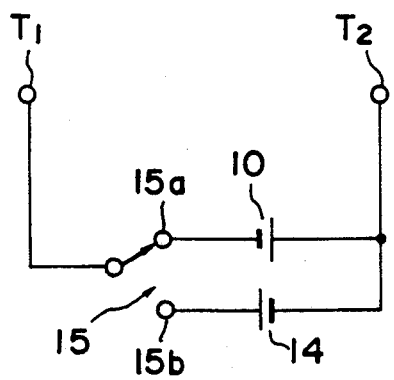
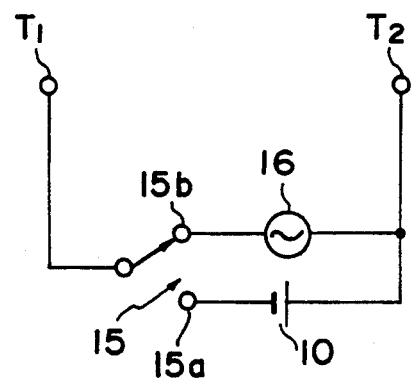
FIG. 8  FIG. 9

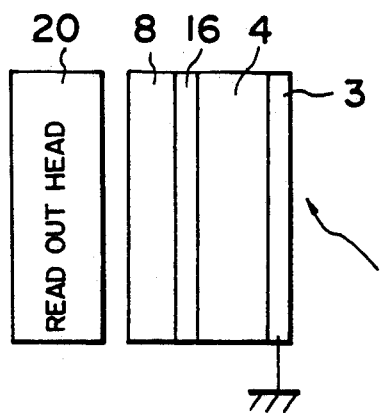 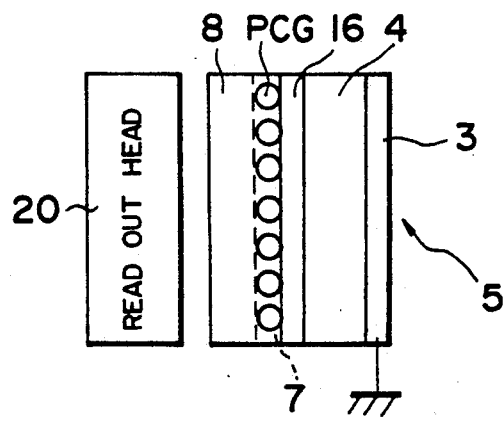
FIG. 21  FIG. 22
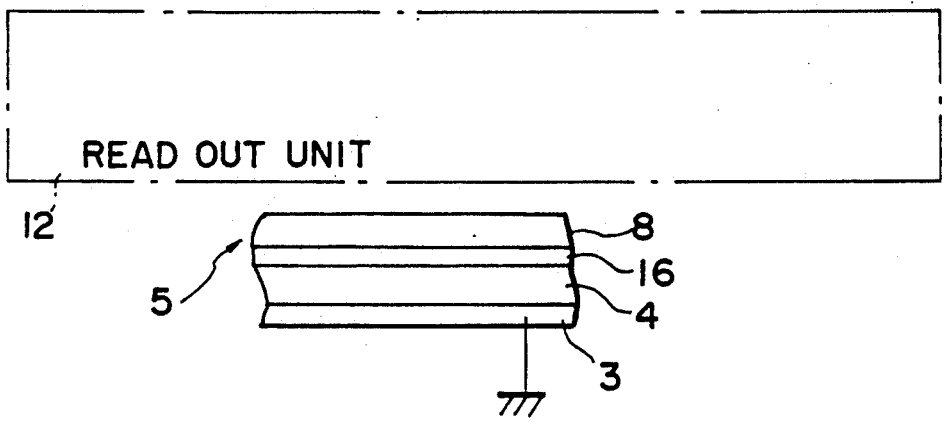
FIG. 23
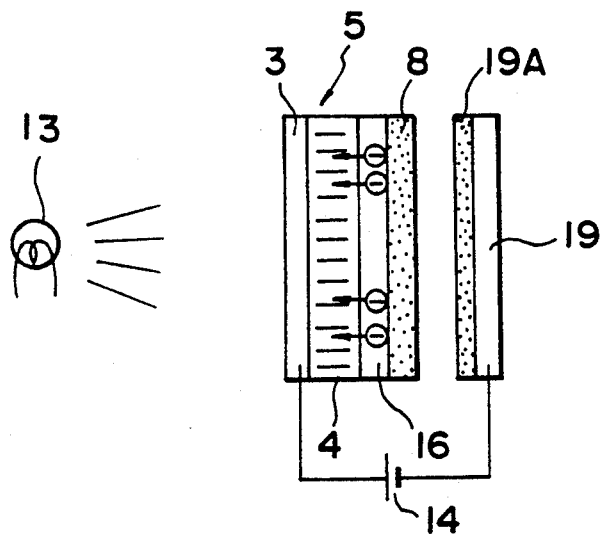
FIG. 24

SYSTEM AND MEDIUM FOR RECORDING/REPRODUCING CHARGE LATENT IMAGE

This is a divisional of application Ser. No. 07/430,983, filed Nov. 3, 1989 which was abandoned upon the filing hereof.

BACKGROUND OF THE INVENTION

The present invention relates to a system for recording/reproducing a charge latent image including a recording medium used therein.

In compliance with an increased demand in recent years for a reproduced image with high picture quality and high resolution various systems such as a so-called EDTV (Extended Definition TV) system, or an HDTV (High Definition TV) system have been proposed for a television system. In order to obtain a reproduced image with high picture quality and high resolution, it is required to provide an image pickup device capable of producing a video signal from which a high picture quality and high resolution image can be recreated. However, for conventional image pickup devices using an image pickup tube, it is difficult to generate such a video signal. The reasons for this are as follows: Since there is a limit to the reduction of the diameter of an electron beam in the pickup tube, high resolution image reproduction by reduction of the diameter of the electron beam cannot be expected. Alternatively, if the target area of the pickup tube is increased, the level of the output signal will be reduced because of the increased output capacity which is proportional to the area of the target. Therefore, high resolution image reproduction by the increase of the target area cannot be realized. Furthermore, in the case of an image pickup device for a moving picture, since the frequency range of such a video signal reaches several tens and several hundreds MHz for implementation of the high resolution image, the increase of output capacity, i.e. the increase of target area, is not preferable.

On the other hand, an increase of picels or a downsizing of a pixel of solid state image sensors has produced difficulties known to the industry.

As stated above, conventional image pickup devices of either a pickup tube or a solid state sensor could not satisfactorily generate such a video signal to provide a reproduced image of high picture quality and high resolution because of the inevitable use of an image sensor in the construction thereof. In order to solve the problem, the assignee of this application has already proposed an imaging system and a recording system to obtain a high resolution optical image by an image pickup device using a photo-to-photo transducer, and to record such an optical image as a charge image of high resolution onto a charge accumulation layer (or a charge hold layer) by using a photo-to-charge transducer.

Naturally, in the implementation of such an imaging system and recording system, a comparably capable read out system is required which reproduces such a charge image recorded on a recording medium as an electric signal. However, no satisfactory reproducing apparatus for this has been available to data.

In the use of the charge latent image, conventional technology has been disclosed in European Patent Application (EPA) No. 89306243.0 (Publication No. 0 348 162 A2) or EPA. No. 87311531.5 (Publication No. 0 273 773 A2).

FIG. 1 shows a schematic arrangement of a recording unit of a prior art system. The recording unit comprises an imaging lens 1 as an imaging means for forming an optical image of an object 0; a recording head 2 consisting of a transparent electrode 3 and a photo-conductive layer (hereinafter abbreviated in a PCL) member 4; a recording medium 5 including a carrier transport layer (CTL) 6 of a hole transport type (HTL) or an electron transport type (ETL), a fine-grained layer 7 formed from a photo-conductive grain (PCG), a dielectric layer (IL) 8, and an electrode 9; a power source 10 for supplying electric power having a specified polarity to the electrodes 3 and 9; and high source 11 for generating an electron-hole pair in the PCG of the fine grained layer 7 by irradiating a light to the medium 5.

The PCG layer 7 is disposed between the CTL 6 and the IL 8. The carrier transport layer 6 is a layer of a compound known to the industry. A layer of such a compound having a high hole mobility is called a hole transport type layer (HTL), and one having a high electron mobility is called an electron transport type layer (ETL).

Depending on the desired charge polarity of the charge latent image eventually recorded in the recording medium 5, either the HTL or the ETL is used for the carrier transport layer 6, i.e., when the HTL is used, the polarity of the charge latent image will be negative, and in the case of the ETL, a positive polarity charge latent image will eventually be left recorded in the recording member 5.

However, since the above technology records the charge of a latent image, which corresponds to charge distribution according to a form of the optical image, on the surface of the recording medium, there is a problem that a preserved condition of charge latent information is deteriorated on the basis of the decrease and change of the recorded charge quantity because of changes in the physical condition during storage and reproducing frequency.

Furthermore, even if there is no problem of resolution for the first time of reproducing the recorded charge latent image, when new charge information is recorded again once after erasing recorded charge information from the medium recording the charge latent image, is a problem that the resolution for reproducing the new latent image is sharply deteriorated in comparison with the former resolution.

SUMMARY OF THE INVENTION

A primary object of the present invention is to provide a system for recording/reproducing a charge latent image and a recording medium used therein, which is capable of readily storing the charge latent image for a long time on the recording medium.

A secondary object of the present invention is to provide a system for recording/reproducing a charge latent image capable of reproducing a video signal having a high resolution even if the charge latent image information is recorded repeatedly such as two, three, or more times on the same medium in the case of repeatedly recording and erasing the charge latent image.

In order to accomplish the above objects, a system for recording/reproducing a charge latent image according to the present invention comprises a recording unit including; a recording medium attachable to and removable from the system and having a transparent electrode provided on the surface, a carrier hold layer attached inside the electrode, and a carrier transport obstruction layer provided inside of the electrode to obstruct the transportation of charges after the hold layer once holds the charges; imaging means for forming an optical image on the recording medium on the basis of an electro-magnetic radiation beam from an object; recording means for recording a charge latent image to make the hold layer hold charges having an intensity distribution corresponding to the latent image imaged on the medium; and a voltage supply for supplying the voltage of a polarity for recording the latent image on the hold layer and for supplying the voltage of the opposite polarity to the recording means.

The system for recording/reproducing the charge latent image has a reproducing unit comprising: a detection means for reading out and detecting electronic information according to charge distribution corresponding to the latent image recorded on the hold layer of the medium; a signal generation means for generating a video signal on the basis of the electronic information detected by the detection means; and a display means for displaying a reproduced video image corresponding to the video signal.

The construction of a recording medium as the aforementioned medium is as follows. For example, a medium has a stacked structure in the order of the transparent electrode plate, a photoconductive layer, the carrier transport obstruction layer, and dielectric layer. Another example, the dielectric layer is formed by a minute particle layer of a dielectric and a photoconductor. In both structures, as the carrier transport obstruction layer obstructs radiation of charges from the hold layer after charge information is once recorded, it is possible to prevent discharge of the charge latent image during ordinary usage.

In the recording unit, the imaging means and the recording means photo-modulate an image information from the object and form an image on the recording medium, and then store charges corresponding to the charge latent image on the basis of the photo-modulated optical information. The detection means of the reproducing unit may detect electrostatically the electric field occurring on the basis of the charge distribution of the latent image on the medium, or may detect the electric field as the electro-magnetic radiation beam. Furthermore, the reproducing unit may comprise a photo-modulation means for modulating the intensity of an optical information according to the charge distribution of the latent image recording on the medium, a photoelectric transfer means for transferring from the optical information modulated in intensity to an electric signal, and an output means capable of outputting the electric signal and the optical information at the same time and/or selectively.

Furthermore, the aforementioned system may comprise an erasing unit for erasing charges held on the hold layer by respectively supplying the voltages to the hold layer and recording means opposite to those supplied to both having the opposite polarity for recording the latent image by the recording unit.

As constituted in the aforementioned construction, the recording unit forms an optical image information on the hold layer of the medium via the transparent electrode and the photoconductor layer if necessary, holds charges of the latent image corresponding to the optical image information, and obstructs the discharging of the charges of the latent image by the charge transport obstruction layer after being held or stored on the medium. Accordingly, the charge quantity of the medium does not decrease and deteriorate even if the latent image held on the medium remains for an extended period. As a result, the charge latent image may be recorded on the recording medium for long periods.

The recording unit having the aforementioned construction has an advantage of being capable of clearly recording the latent image, because the unit records the latent image by means of supplying voltage having one polarity to the hold layer and voltage having the opposite polarity to the recording means.

Furthermore, as the erasing unit prevents charges from being held on the medium by supplying voltages respectively having opposite polarities than those used during recording of the latent image, it is possible to erase the charge latent image properly and simply.

By the above construction, as the recording medium has the obstruction layer for preventing the transportation of the charges to the surface of the medium when the recording unit records the latent image, surface discharge does not occur, so that it is possible to clearly and easily record the charge latent image so as to obtain a reproduced video picture having a high resolution.

BRIEF DESCRIPTION OF THE DRAWINGS

The invention will now be described in detail with reference to the accompanying drawings wherein:

FIGS. 6 to 10 are block diagrams respectively showing a latent image erasing process by an erasing unit applied to the system for recording/reproducing a latent image according to the first embodiment of the present invention;

FIGS. 11 to 12 are perspective schematic views showing the recording/reproducing system according to the first embodiment of the present invention, in which FIG. 11 shows a reflexive medium and FIG. 12 shows a transparency medium;

FIGS. 19 to 22 are schematic diagrams respectively showing a reproducing unit of the system according to the second embodiment of this invention;

FIG. 23 is a cross-sectional view showing image reading operation of the reading gout head shown in FIGS. 21 and 22;

FIGS. 24 and 25 are schematic cross-sectional views schematically showing the erasing process of the system according to the second embodiment of this invention.

DETAILED DESCRIPTION OF THE PREFERRED EMBODIMENTS

There will now be described in detail preferred embodiments of a system for recording/reproducing a charge latent image according to the present invention, with reference to the accompanying drawings.

The first embodiment of the system for recording/reproducing the latent image of this invention is described with reference to FIGS. 1 to 16.

Figure 1:
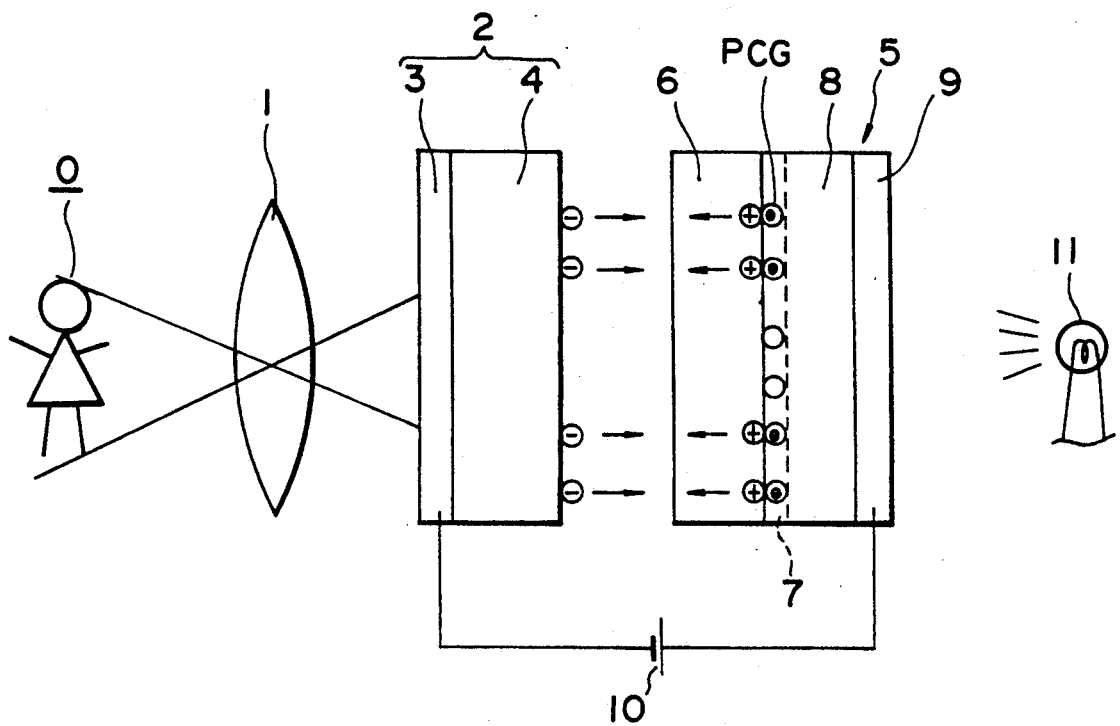
FIG. 1 is a block diagram showing the recording unit in the prior art.
Figure 2:
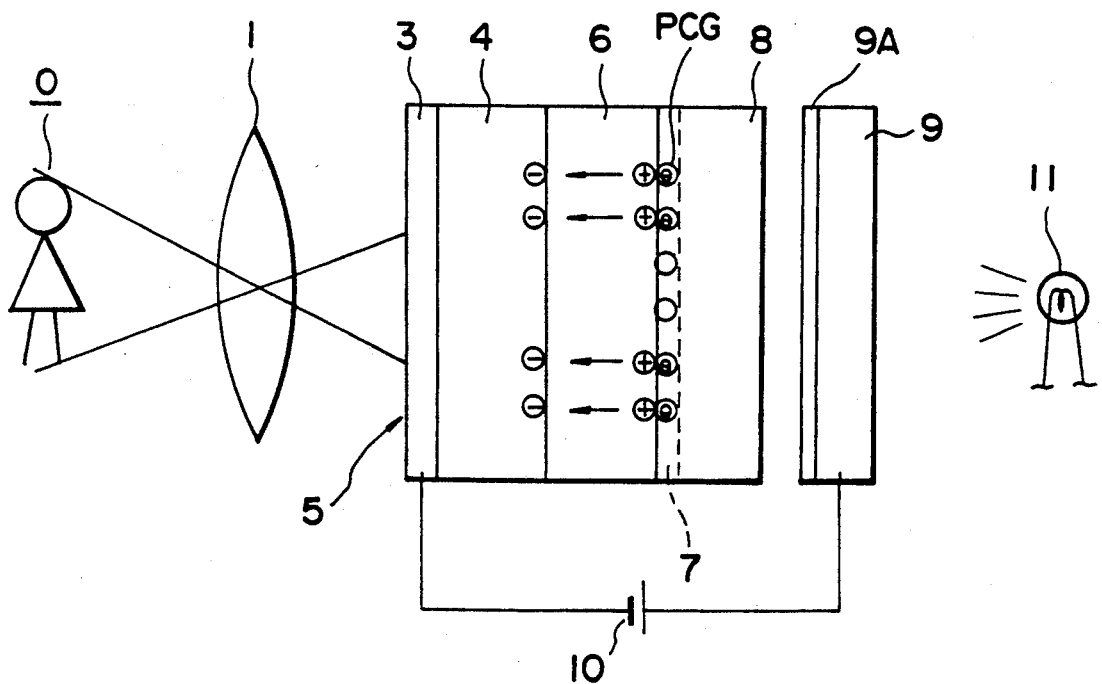
FIG. 2 is a block diagram showing a recording unit of a system for recording/reproducing a charge latent image according to the first embodiment of the present invention.

The recording unit shown in FIG. 2 is the first embodiment of the invention and the same numerals in FIG. 2 denote similar components to those of FIG. 1. A different part is a multilayer structure of a recording medium 5 comprising a transparent electrode 3, a photo-conductor layer 4, a carrier transport layer 6 made of a hole transport type or an electron transport type, a fine-grained layer 7 made of photo-conductor grain PCGH, and a dielectric layer 8.

The electrode plates 3 and 9 are comprised of a thin metal layer and an electrically-conductive film made of $SnO_2$ (which may be a NESA film, a trade name F.P.P.G. Industries, Inc.). The PCL member 4 is comprised of a thin layer of a proper photo-conductive material.

The IL member 8 is comprised of a dielectric material layer having an isolation resistance such as proper high polymer materials.

The fine grained layer 7 of the PCG grains in the latent image recording medium 5 is formed so that the photo-conductor grains are distributed by proper means onto the IL member 8 having high isolation resistance. For example, photo-conductor materials are vapored or splittered onto the IL member 8 having high isolation resistance through a proper mask pattern. Accordingly, there is a condition that countless fine grains of the photo-conductor are separated and distributed with respect to each other.

The recording medium 5 shown in FIGS. 1 and 2 is formed by a vapor method, sputtering method or the like in the manner where several layers are stacked in order. The aforementioned medium 5 is also formed in various shapes such as disk shape, sheet shape, tape shape, card shape, and the like.

In the recording unit shown in FIG. 1, when optical information regarding the object O is formed on the PCL member 4 through the lens 1 and the electrode 3 of the recording head 2, an electrical resistance of the PCL member 4 is reduced according to an intensity distribution of the optical information of the object O.

The surface of the PCL member 4 opposes in facing spaced relationship the surface of the CTL member 6 of the HTL type of the recording medium 5 with a small gap. As the predetermined voltage is supplied from the source 10 to the electrode 3 of the recording head 2 and the electrode 9 of the medium 5, the electric field distribution developed in the gap between the PCL member 4 and the HTL type CTL member 6, correspondingly represents a two-dimensional optical information of the object O as the resistance distribution of the PCL member 4 corresponds to the intensity distribution of the object O, so that a negative latent image is first formed on the surface of the HTL type CTL member 6 of the medium 5 due to arcing conduction developing in the gap between the PCL member 4 and the CTL 6.

The medium 5 in the condition that the negative latent image is formed on the surface of the HTL type CTL 6, is irradiated by a light from the source 11 to make the fine grains PCG of the layer 7 generate the electron-hole pairs.

The holes of the electron-hole pairs of the PCG in the layer 7 are attracted by the negatively biased electrode 3 so as to reach the surface of the HTL type CTL member 6 to thereby neutralize the negative charges formed on the surface of the HTL type CTL member 6 of the medium 5.

As the positive holes of the electron-hole pairs move out and dissipate electrons of the pairs are left to form a negative latent image to be recorded according to the optical information of the object O.

The remaining departed electron-hole pairs of the fine grains PCG are recoupled to return to the original state upon removing the source 11 so that those recoupled PCG become electrically neutral.

The charge latent image recorded by the HTL type CTL member 6, and the thin layer 7 of the grains PCG, is in a highly stable state over a long period of time as the IL member 8 is made of an insulator and surrounds the PCG layer 7.

Next, will be described functions of the recording unit as shown in FIG. 2. When an optical information of the object O is imaged on the PCL member 4 by the imaging lens 1 through the transparent electrode 3, the source 10 supplies the predetermined voltage to the electrodes 3 and 9. As the electrode 9 has a dielectric thin layer (CL) 9A which is transparent and the IL 8 of the recording medium 5 is opposed in spaced facing relation thereto through a small space, the electric resistance of the PCL member 4 changes according to the imaged optical information of the object.

Accordingly, an electric field strength between the PCL member 4 and electrode 9 corresponds to the optical information of the object O, so that a negative charge latent image corresponding to the optical image of the object O is formed on a boundary surface of the PCL member 4 and CTL member 6.

As the configuration of FIG. 2 does not involve such an arcing conduction in the gap between the PCL member 4 and CTL member 6, the initially conditioned voltage distribution through the stacked layers between electrodes 3 and 9 is stable during the recording process. Thus, stable recording of the charge latent image is assured. It should be noted that there is no arcing in the gap between the IL 8 and the dielectric thin layer (CL) 9A because the material of the opposing surfaces are both non-conductive.

When the light source 11 irradiates the medium 5 having the negative charge latent image on the boundary surface of the PCL member 4 and CTL member 6, the electron-hole pairs are developed in the grains PCG of the layer 7 are provided at a boundary surface of the CTL member.

In the electron-hole pairs developed in the layer 7 in the aforementioned manner, the holes are attracted by the negative potential electrode 3 through the HTL type CTL member 6 to reach a boundary surface of the CTL member 6 and PCL member 4, so that the negative charge of the latent image is neutralized by the holes moved from the pairs. As a result, the photo-conductor grains PCG are left to become negative in polarity, so that the negative charge latent image is recorded with the fine grains corresponding to the optical image as in the case of the FIG. 1 arrangement.

The charge latent image recorded in the PCG layer 7 is highly stable over a long period of time because the insulator IL member 8 encircles the charged grains of the layer 7.

It should be noted that in both the arrangements of FIGS. 1 and 2, in order to move out the holes in the PCG layer 7 by the irradiation of the light from the source 11, negatively biasing the electrode 3 is not necessarily needed, as the charge latent image at the boundary between the PCL member 4 and the CTL member 6 is already negative and thus is attracted to the positive holes.

Figure 3:
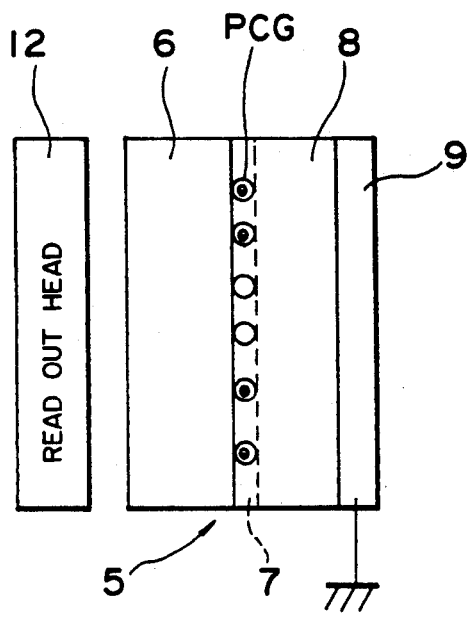
FIGS. 3 and 4 are block diagrams respectively showing a reproducing unit of the system according to the first embodiment of the present invention.
Figure 4:
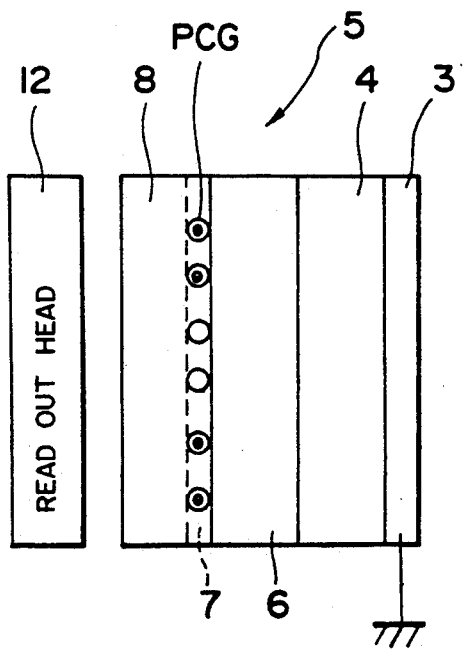
Figure 5A:
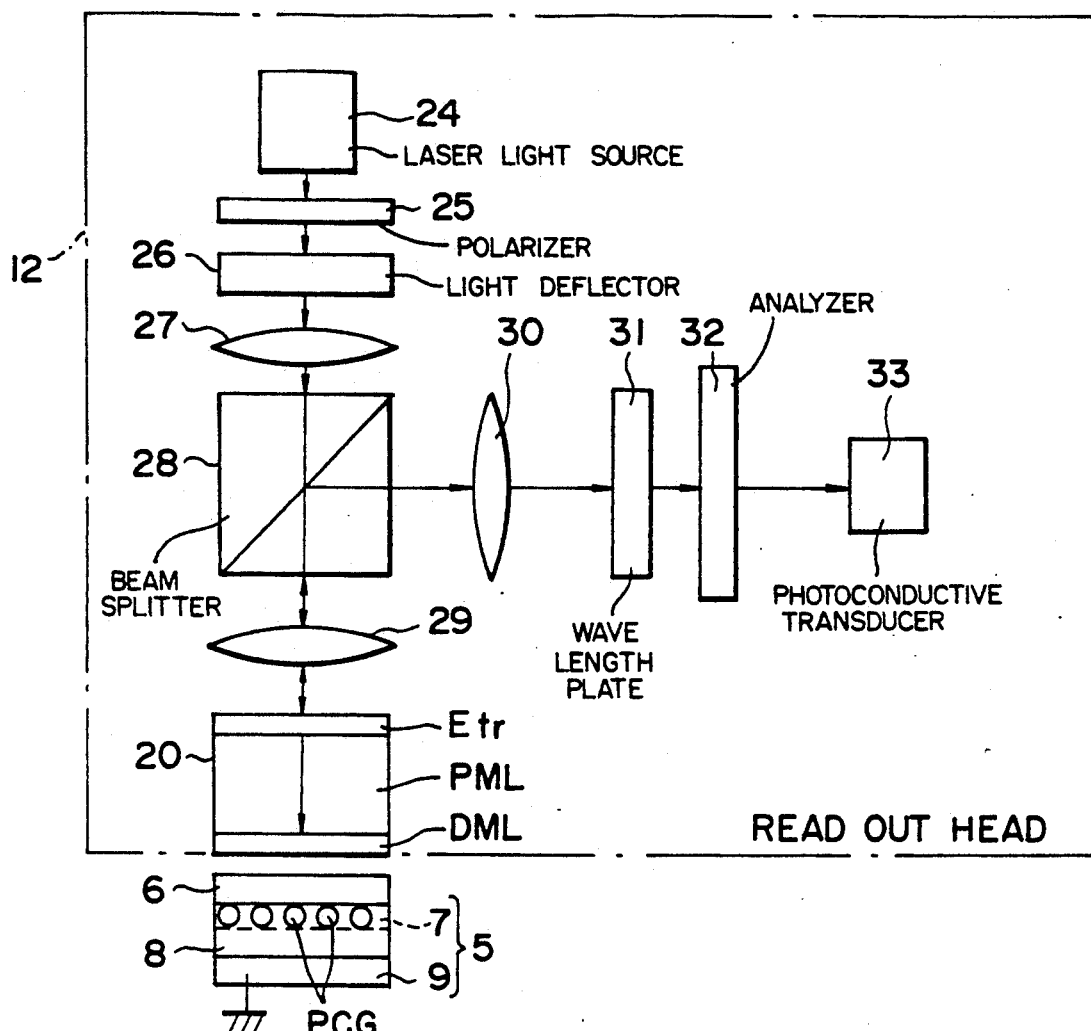
FIGS. 5A and 5B are block diagrams respectively showing the information reading operation of read out head from medium shown in FIG. 3 (FIG. 5A) and FIG. 4 (FIG. 5B)

Reading of the charge latent image from the recording medium 5, recorded as described before according to FIGS. 1 and 2, is performed by a conventional read out head 12 for electrostatically reading out the information as shown in FIG. 3 or 4, or by a conventional read out head using an electro-magnetic radiation beam as shown in FIG. 5A.

As the detailed construction and function of the read out head 12 are disclosed in the specification and drawings of the European Patent (EP) Application (Publication No. 0 348 162) No. 89306243.0 (see the description from line 11 of page 43 to line 19 of page 49, and FIGS. 54 to 60 thereof), a detailed description is omitted in this specification. However, in this application, the recording medium RM shown in FIG. 57 of the above EP Publication No. 0348162 is equal to the configuration of the recording medium 5 of the present invention as shown in FIGS. 5A and 5B.

In these figures, the read out head 12 corresponds to the charge latent image read out head RH in FIG. 57 of the EP Publication No. 0348162 and has the same configuration. As shown in FIG. 5A, the read out head 12 comprises a laser light source 24 (or a light source 24 using a halogen lamp), a polarizer 25, a light deflector 26, a collimator lens 27, and a beam splitter 28, a lens 29. The head 12 further comprises a focusing lens 30, a wavelength plate 31, an analyzer 32, and a photoconductive transducer 33. The head 12 includes a head element 20 comprising an electrode Etr, a photo-modulation layer (PML) member, and a dielectric mirror layer (DML).

Figure 5B:
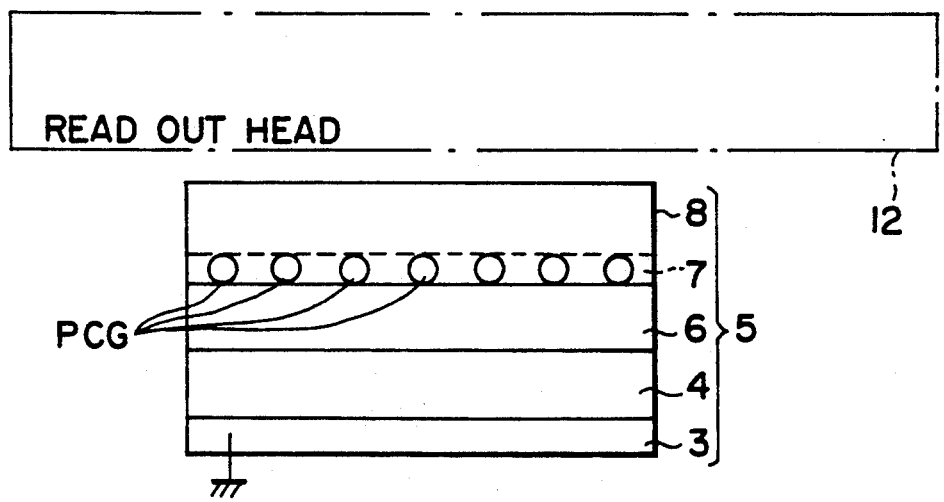

Accordingly, the medium 5 shown in FIG. 5A is a reflection type, where the recorded information is read out as the electro-magnetic radiation beam is reflected by the dielectric mirror layer DML of the head 20, while the medium 5 shown in FIG. 5B is a transmission type where the recorded information is read out as the electro-magnetic radiation beam passes through the recording medium 5.

Next, referring to FIGS. 6 to 10, an erasing system for the charge latent image will be described when the latent image is recorded on the medium 5. FIG. 6 is a configuration in order to explain the erasing system for erasing the charge latent image which is recorded on the medium 5 by the recording unit shown in FIG. 1, while FIG. 7 is for the same purpose for the medium 5 shown in FIG. 2.

In FIGS. 6 and 7, numeral 13 denotes a light source for erasing the images through the electrode 3, 14 denotes an electric power source which is connected to the electrodes 3 and 9 respectively through terminals T1 and T2 for supplying electric power, the polarity of which is reversed to that at the time of recording.

As shown in FIGS. 6 and 7, the incident light irradiated from the light source 13 to the electrode 3 causes the PCL member 4 to become conductive and allows positive charges to pass through the HTL type CTL member 6 to neutralize the recorded negative charge latent image held in the grains PCG in the PCG thin layer 7, so that the latent image on the recording medium 5 is erased by a bias applied by the erasing source 14.

Next, an erasing system for the latent image is described referring to FIGS. 8 and 9. In both figures, a numeral 10 denotes the power source for recording as mentioned before, 14 denotes the power source for erasing, 15 denotes a changeover switch, 16 denotes an alternating current power source for erasing, and T1 and T2 denote connection terminals which represent the same terminals shown in FIGS. 6 and 7.

The recording medium 5 and the light source 13 are omitted from FIGS. 8 and 9 for the purpose of convenience of explanation only.

In FIG. 8, the medium 5 already recorded with the charge latent image is omitted, but one of the fixed contacts of the switch 15 is connected to the negative electrode of the recording source 10, while the other of the fixed contacts is connected to the positive electrode of the erasing source 14.

The positive electrode of the recording source 10 and the negative electrode of the erasing source 14 are connected to the connecting terminal T2. Accordingly, the moving contact of the switch 15 contacts the fixed contact 15a during recording operation, and the fixed contact 15b during erasing operation.

Also in FIG. 9, the moving contact of the switch 15 contacts fixed contact 15a during recording, and is changed over to a fixed contact 15b for applying an alternating current to the recording medium 5 in an erasing operation.

In the erasing systems shown in FIGS. 6, 7, 8 and 9, when the light of the light source 13 for erasing the charge images is projected through the electrode 3 which is transparent, the PCL member 4 becomes conductive to allow positive or negative charges from the power sources 10, 14 and 16 to move through the PCL member 4 and the CTL member 6, whereby the charge latent image in the PCG layer 7 is erased.

For erasing the charge latent image more effectively, an amplitude of the a.c. power source 16 may be gradually reduced, or at the instance of terminating the applied a.c. current the polarity of the waveform of the a.c. power source may be controlled so as to be opposite to the polarity of the d.c. bias used for recording.

Figure 10:
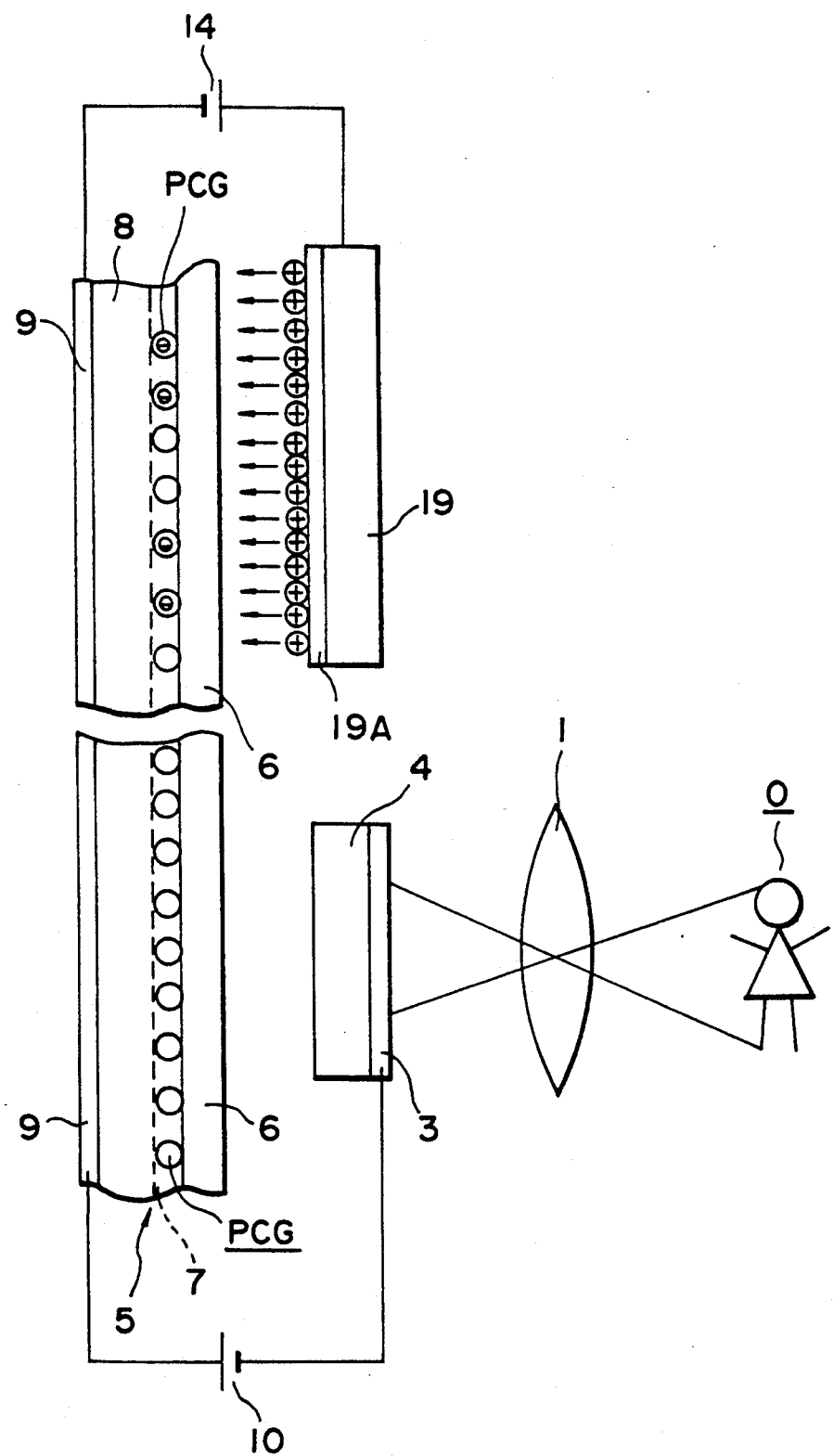

FIG. 10 is the cross-sectional view showing the charge latent image recorded by the recording system shown in FIG. 1 immediately after the latent image previously recorded is erased by the erasing system shown in FIG. 6. In FIG. 10, numeral 19 denotes an electrode which is connected to the electrode 9 through the power source 14 in order to read out the recorded information.

Figure 11:
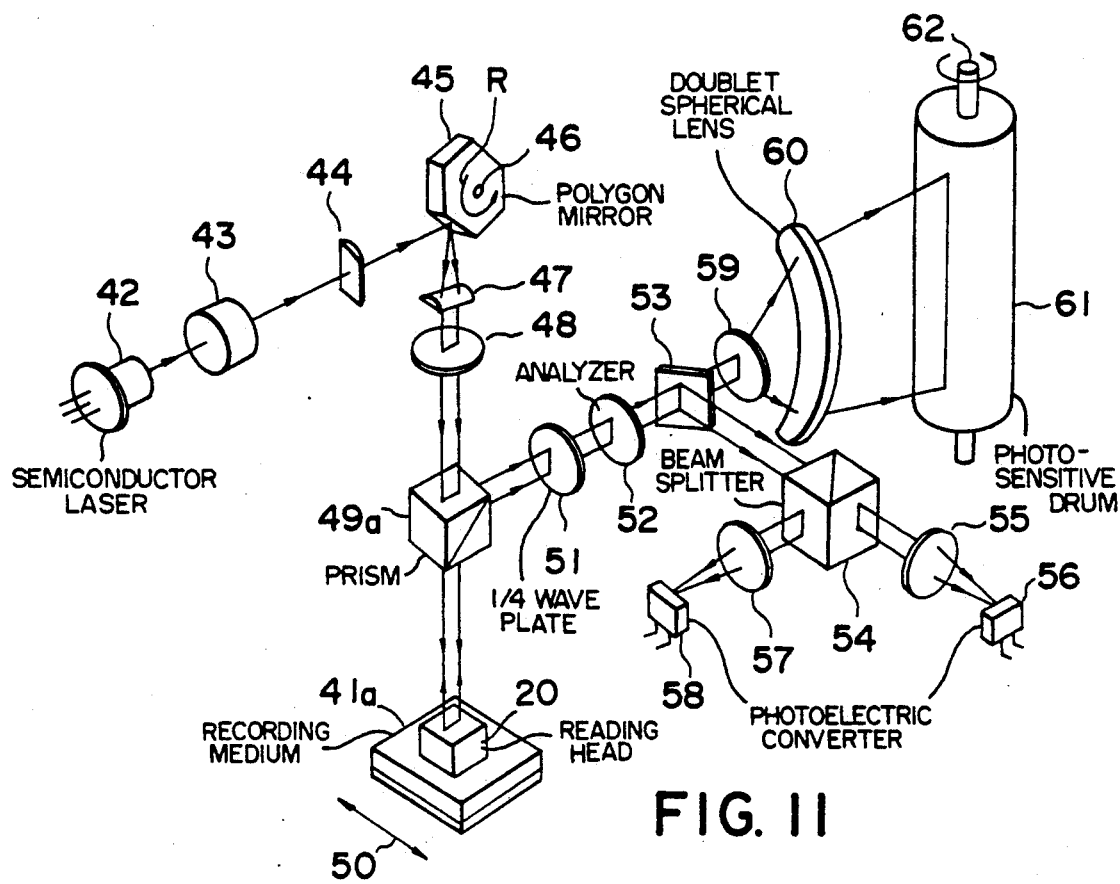
Figure 12:
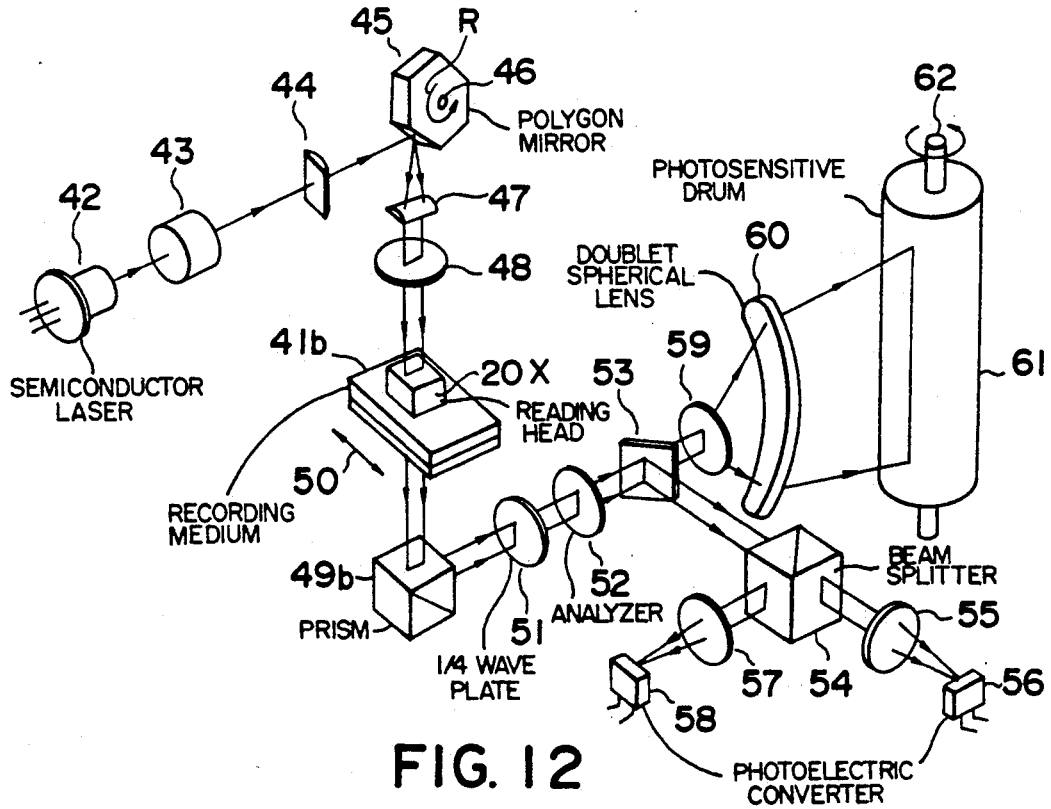

Next, referring to FIGS. 11 and 12, there is described in detail a charge latent image reproduction system for reading optically a charge latent image prerecorded in the recording medium 41a or 41b. The recording medium 41a is the reflection type medium such as shown in FIG. 5A, while the recording medium 41b is the transmission type medium such as shown in FIG. 5B. FIG. 11 shows the reproduction system for readout out charge information from the reflection type recording medium, while FIG. 12 shows the transmission type recording medium.

The reproduction system for the reflection type comprises, as shown in FIG. 11, a semiconductor laser 42 for irradiating a laser beam having a predetermined intensity of light, a collimator lens 43 for aligning the laser beam into a beam of parallel rays, a rotary polygon mirror 45 pivoted by a shaft 46 and rotatable in the direction of arrow R in the figure, a cylindrical lens 44 and a toroidal lens 47 for correcting reflection errors caused by the polygon mirror 45 which produces, with a doublet spherical lens 48, deflected laser rays having a constant scanning speed.

A semi-transparent prism 49a passes the laser rays from the doublet spherical lens 48 to a reading head 20 which is the same head shown in FIG. 8, but reflects the laser rays returned from the reading head 20, toward a ¼ wave plate 51. The lenses 47 and 48, prism 49a, and the medium 41 are aligned with each other along the path of the laser rays. The rotary polygon mirror 45 and the lens 48 project linearly deflected laser rays onto the medium 41 in the predetermined main-scanning direction through the reading head 20. The medium 41 is moved perpendicular to the main scanning direction, for example, in the direction of arrow 50 of the figure.

The optical system further comprises in the general direction extending perpendicular to the path of the laser rays reflected by the polygon mirror 46 toward the prism 49a, a ¼ wavelength plate 51, an analyzer 52, and a mirror 53 which may be a total reflection or semi-transparent mirror. There are provided a beam splitter 54 and a first photoelectric converter system comprising a lens 5 and a photoelectric converter unit 56. Furthermore, a second photoelectric converter system comprises a condenser lens 57 and a photoelectric converter unit 58. The system further comprises a magnifying lens 59, a doublet spherical lens 60, and a photosensitive drum 61 having a rotational shaft 62, in the direction of extension of the optical axis of the ¼ wavelength plate 51 and the analyzer 52. When the photosensitive drum 61 is used and the mirror 53 is a total reflection mirror, i.e., when the first and second photoelectric converter systems are not used, a rotational or sliding mechanism (not shown) makes the mirror 53 rotate or slide out of the path, so that the laser rays from the direction of the prism 49 can reach the drum 61 through the lens 60.

If the mirror 53 is a semi-transparent mirror in place of the total reflection mirror 53, it is unnecessary to provide the rotational or sliding mechanism mentioned above, and it is possible to provide the semi-transparent mirror permanently, which simplifies the whole configuration.

An optical system using the transmission type recording medium, as shown in FIG. 12, has the medium 41b, a reading head 20X and a total reflection prism 49b all disposed along a path of the laser rays projected from the spherical lens 48. Other configuration is the same as shown in FIG. 11, so that a duplicated description thereof is omitted.

In FIGS. 11 and 12, the magnifying lens 59, and the doublet spherical lens 60 for projecting the reproduced optical information read out from the medium 41b or 41b, to the photosensitive drum 61 for printing the information on papers or other processes.

The reading operation itself in FIG. 11 for reading the prerecorded information on the reflection type recording medium 41b by the reading head 20 is the same as the one explained with FIG. 5A, and thus the explanation thereof is omitted.

The reading operation shown in FIG. 12 for reading the prerecorded information on the transmission type recording medium 41b is as follows.

A reading head 20X is quite similar in construction to the reading head 20 but head 20X lacks the dielectric mirror layer DML of the head 20 and the photomodulation layer PML direction opposes the dielectric layer 8 of the recording medium 41b, so that the PML layer is subject to the electric field of the charge latent image prerecorded in the PCG layer 7.

The recording medium 41b comprises at least, as shown in FIG. 5 B as the recording medium 5, the transparent electrode 3, the PCL member 4, the CTL member 6, the PCG layer 7, and the dielectric layer 8. When the medium 41b receives the laser rays, the transparent electrodes 3 allows the rays to pass therethrough. In the transparent type medium 41b, the laser rays also passes through the layers 4, 6, 7 and 8.

When the laser ray passes through the photomodulation layer PML of the reading head 20, a polarization plane of the two-dimensional electric field distribution is applied to the PML layer from the charge latent image in the PCG layer 7. Accordingly, the laser ray passes through the medium 41bis polarization plane modulated and is reflected by the prism 49b toward the ¼ wavelength plate 51, and is further converted into an intensity modulated light by the analyzer 52.

In both the charge latent image reproduction systems of FIGS. 11 and 12, the laser ray changes its optical path by the prism 49 to reach the reflection mirror 53 through the ¼ wavelength plate 51 and the analyzer 52. When the reproduced optical information is converted into electric signals, since the total reflection mirror 53 moves into the optical path by a driving mechanism (not shown), the photoelectric converter unit 56 or 58 outputs the electric signals.

Accordingly, the systems shown in FIGS. 11 and 12 show that optical information read out from either the reflective type recording medium 41a or 41b is converted switchably into either an electrical signal or an intensity modulated optical beam through the lenses 59 and 60 by controlling the placement of the total reflection mirror 53, and further, by using a semi-transparent mirror in place of the mirror 53, so that both the intensity modulated optical beam and the electrical signal are obtained simultaneously.

Next, a system according to a second embodiment of the present invention will be described hereinafter.

Figure 13:
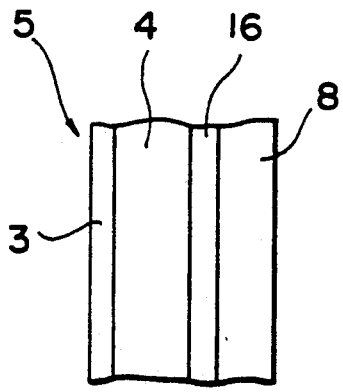
FIGS. 13 and 14 are cross-sectional views respectively showing a part of the recording medium applied to a latent image recording/reproducing system according to a second embodiment of the present invention.
Figure 14:
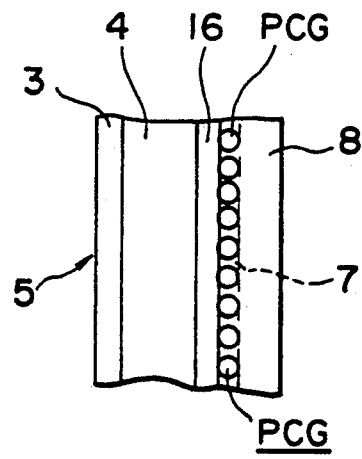

FIGS. 13 and 14 are partial sectional views of recording mediums used in the system of the second embodiment. In FIG. 13, a recording medium 5 comprises a transparent electrode 3, a photoconductor layer (PCL) member 4, a charge transfer suppressive layer (ESL) 16, and a dielectric layer (IL) 8. In FIG. 14, a recording medium 5 comprises the same components as in FIG. 13 except for a thin layer 7 of a photoconductive fine grain (PCG) residing in FIG. 8.

The electrodes 3 in FIGS. 13 and 14 are formed of a metal thin layer or an electro-conductive film made of $SnO_2$ (which may be a NESA film, a trade name of P.P.G. Industries, Inc.) layer. The PCL member 4 is formed by a thin film of proper photoconductive materials. The IL member 8 is formed by dielectric materials having a high insulation resistance and may use a proper macromolecular material film.

Furthermore, the ESL 16 shown in FIGS. 13 and 14 may be a thin dielectric material film in which a tunnel current flows by the tunnel effect when the ESL 16 is exposed to a strong electric field. For instance, a thin film of a silicon-dioxide or alumina is used as the ESL 16.

As a production process of the PCG thin layer is the same as in the first embodiment, a duplicated description is omitted.

Figure 15:
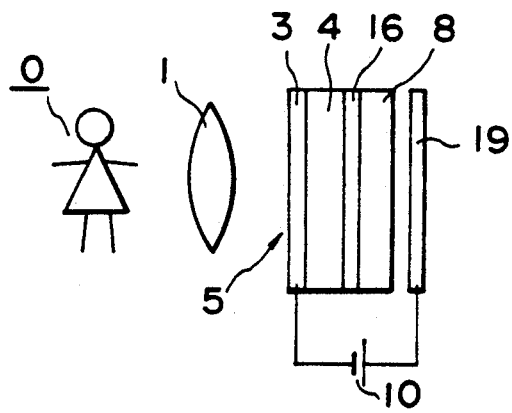
FIGS. 15 to 18 are schematic diagrams respectively showing a recording unit of the system according to the second embodiment of this invention.
Figure 16:
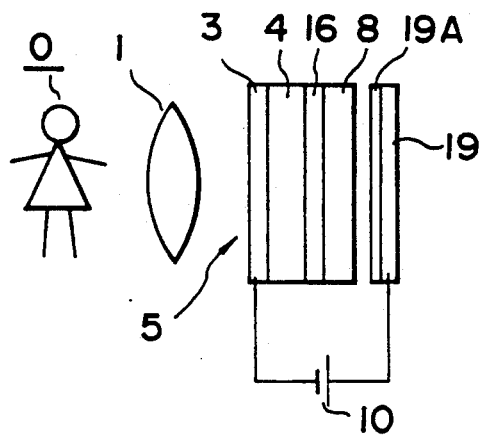

FIGS. 15 and 16 are sectional views of the recording system according to the second embodiment of the invention. In the figures, a recording unit has an electrode 19 for recording a charge latent image, and a dielectric layer (DL) thin film 19A. The power source 10 is electrically connected between the electrodes 3 and 9.

Operation of the recording system is substantially equal to the first embodiment. The charge latent image corresponding to the optical image of the object O is recorded on the medium at the boundary plane of the ESL member 16 and the IL member 8.

Figure 17:
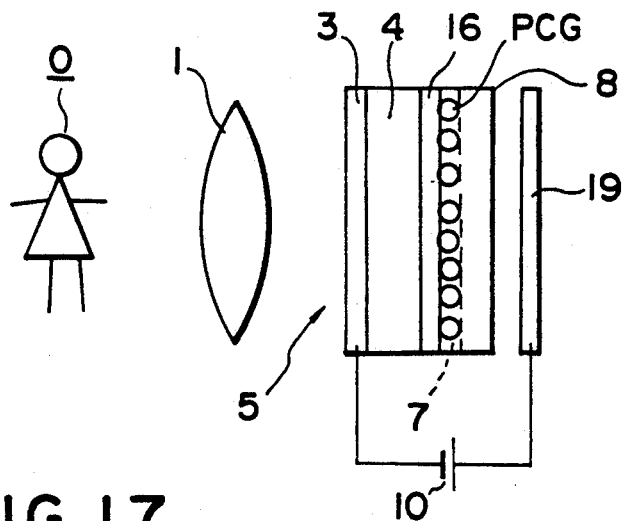
Figure 18:
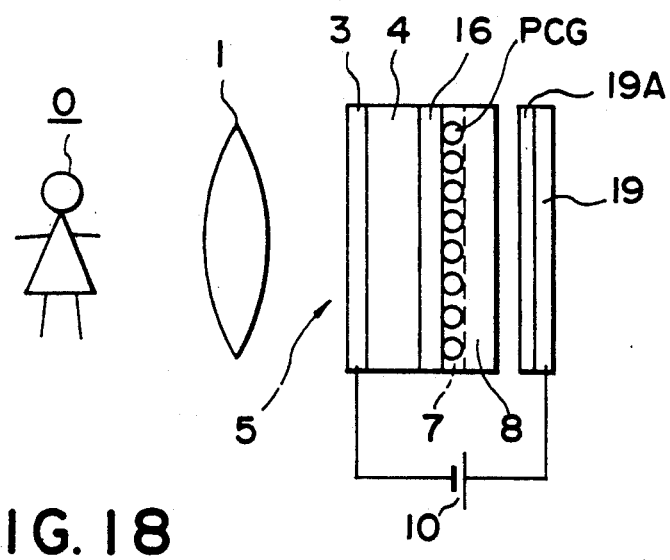

As shown in FIGS. 17 and 18, the charge latent image is also recorded in the tin PCG layer 7 of the recording medium 5. Recording operation is the same as the first embodiment shown in FIGS. 1 to 4.

Figure 19:
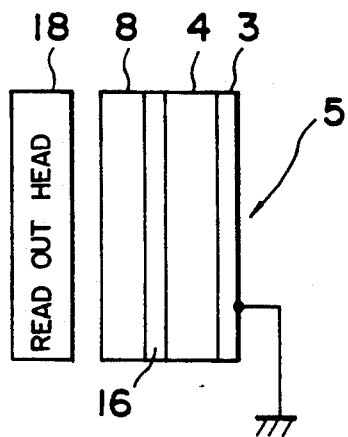
Figure 20:
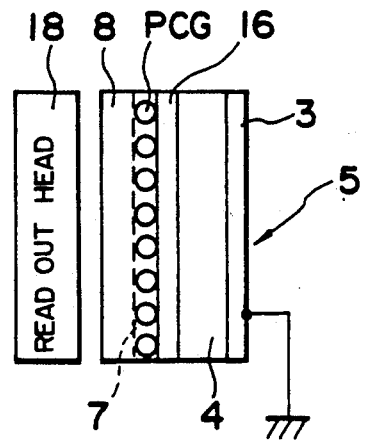

The recorded information is read out by a read out system shown in FIGS. 19 to 22. Namely, read out operation in FIGS. 19 and 20, is performed by an electrostatic type read out head 18 which electrostatically reads out the recorded information from the medium 5, while the read out system shown in FIGS. 21 and 22 uses an optical type read out head 20 which optically reads out the recorded latent image.

Another read out system shown in FIG. 23 uses an electrostatic read out head 12. Except for the recording medium 5, the read out head 18, 20 and 12 and their read out operation are disclosed in the aforementioned EP Publication No. 0223773 or EP Publication No. 0348162. Operation of the head in particular is explained in the description of first embodiment.

Referring to FIG. 23, the second embodiment uses the recording medium 5 different from one disclosed in the European applications referred to. The medium 5 comprises the transparent electrode 3, the PCL member 4, the ESL member 16, and the IL member 8, as mentioned previously. The read out unit (head) 12 has the same configuration as that in the EP publications.

Figure 25:
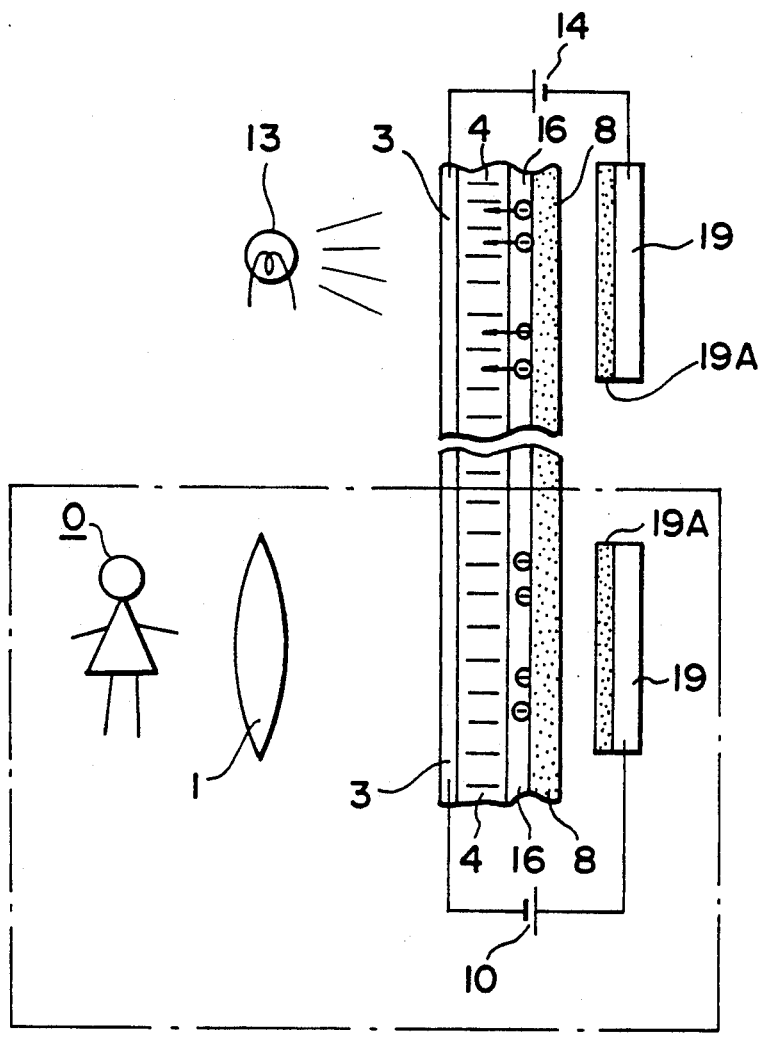

Next, an erasing system according to the second embodiment is described, with reference to FIGS. 24 and 25. FIG. 24 shows the erasing system which erases the charge latent image recorded by the recording system shown in FIG. 15. In FIG. 24, the erasing system comprises an erasing light source 13, a recorded medium 5 having the electrode 3, the PCL member 4, the ESL member 16 and the IL member 8, an erasing electrode 19 having the DL thin film 19A, and power source 14 for erasing the image.

The erasing operation is substantially the same as that in the first embodiment and therefore further detailed description is omitted here.

FIG. 25 shows a recording and erasing system in which the charge latent image is recorded by the recording unit shown in FIG. 16 and is subsequently erased by the erasing system shown in FIG. 24. Namely, it is possible for the system shown in FIG. 25 to erase a previous image and to record a new image in a substantially close timing sequence.

Next, a system according to a third embodiment of the present invention is described with reference to FIGS. 1, 2, 26(a) and 26(b).

In order to conduct repeated recordings on a single recording medium 5 without performing a positive erasing operation between the repeated recordings, the recording systems of FIGS. 1 and 2 are modified in such a way that the polarity of the power source 10 is made reversible by a switch (not shown). In either the recording system of FIG. 1 or 2, after recording operation is completed by irradiating the PCG layer 7 with the source 11, the polarity of the power source 10 is reversed so that a positive potential is applied to the electrode 3 and the negative potential is applied to the electrode 9. Thereafter, a new optical information is projected to the PCL member 4 with the source 11 being turned off. A shutter (not shown) may be used for exposing the PCL member 4 to each incoming optical information.

By performing the operation just described, the erasing of the previously recorded charge image occurs simultaneously. Irradiating the PCG layer 7 thereafter by the source 11 causes the electrons of the electron-hole pairs to move within the CTL member 6 toward the PCL member 4 leaving a positive charge latent image in the PCG layer 7.

Figure 26:
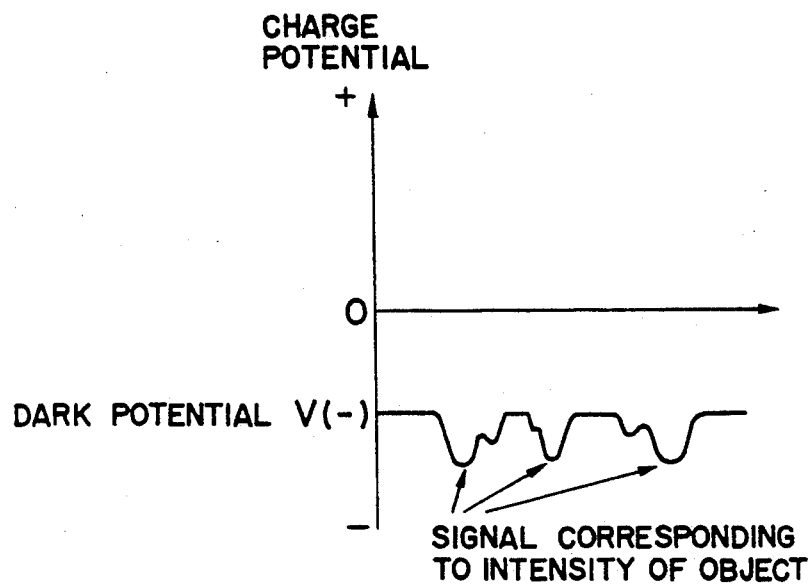
FIGS. 26(a) and 26(b) are characteristics diagrams showing the potential distribution supplied between electrodes to explain the recording condition of the recording unit according to the third embodiment of this invention.
Figure 26:
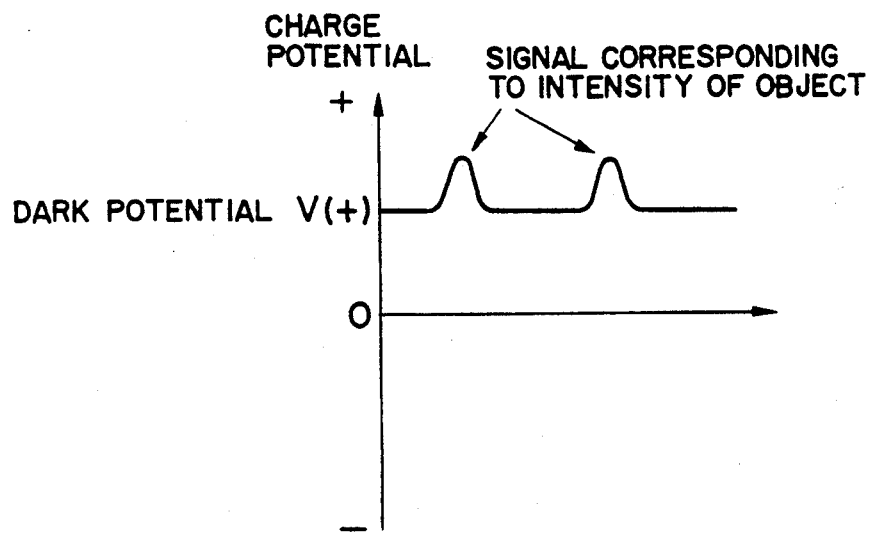

FIG. 26(a) shows a condition of the initial recording where the negative charge latent image is in the PCG layer 7, and a charge potential distribution corresponding to one horizontal or vertical line of the recorded charge image rises in parts corresponding to the intensity of the optical image of a first object, wherein a symbol (V−) denotes a so-called dark potential in the minus region below the zero level in the diagram.

FIG. 26(b) shows a charge potential distribution of the same nature of the positive charge latent image as a result of the subsequent new recording and the simultaneous erasing operation, wherein a symbol (V(+) denotes the dark potential in the plus region. The curve in the diagram represents an intensity distribution along one line of a second optical image taken from the object O.

It should be noted that the source 13 can be any kind of electromagnetic radiation source which causes the electron-hole pairs in the PCG layer 7.

We claim:

1. A system for recording a charge latent image, comprising:

a medium for recording a charge latent image comprised of a laminated body including a transparent electrode, a photoconductive layer, a charge transfer suppressive layer, and a first dielectric layer, wherein said photoconductive layer is between said transparent electrode and said charge transfer suppressive layer, is between said photoconductive layer and said first dielectric layer;

a first electrode having a surface which opposes, in facing spaced relationship, a surface of said first dielectric layer;

means for impressing a voltage between said transparent electrode and said further electrode; and optical imaging means for projecting optical information from an object through said transparent electrode of said medium.

2. A system as claimed in claim 1 and further comprising:

a thin second dielectric layer on said surface of said further electrode which opposes, in facing spaced relationship, said dielectric layer of said medium.

3. A system for recording a charge latent image, comprising:

a medium for recording a charge latent image comprised of a laminated body including a transparent electrode, a photoconductive grain layer, a charge transfer suppressive layer, a photoconductive layer, and a first dielectric layer, wherein said photoconductive layer is between said transparent electrode and said charge transfer suppressive layer, said charge transfer suppressive layer is between said photoconductive layer and said photoconductive grain layer, and said photoconductive grain layer is between said charge transfer suppressive layer and first dielectric layer;

a further electrode having a surface which opposes, in facing spaced relationship, a surface of said first dielectric layer;

means for impressing a voltage between said transparent electrode and said further electrode; and optical imaging means for projecting optical information from an object through said transparent electrode of said medium.

4. A system as claimed in claim 3 and further comprising:

a thin second dielectric layer on said surface of said further electrode which opposes, in facing spaced relationship, said first dielectric layer of said medium.

* * * * *